United States Patent [19]  
Abraham et al.

[11] Patent Number: 4,910,282  
[45] Date of Patent: Mar. 20, 1990

[54] LOW GLASS TRANSITION TEMPERATURE AROMATIC POLYAMIDE

[75] Inventors: Tonson Abraham, Elyria; Robert C. Evers; Edward J. Soloski, both of Dayton, all of Ohio

[73] Assignee: The United States of America as represented by the Secretary of the Air Force, Washington, D.C.

[21] Appl. No.: 241,156

[22] Filed: Aug. 15, 1988

[51] Int. Cl.⁴ ........................................... C08G 69/32
[52] U.S. Cl. .................................... 528/185; 528/125; 528/171; 528/172; 528/173; 528/331; 528/348; 562/429; 562/430; 562/433; 562/452; 562/457; 562/458
[58] Field of Search ............... 528/185, 125, 171, 172, 528/173

[56] References Cited

U.S. PATENT DOCUMENTS

| | | | |
|---|---|---|---|
| 3,408,334 | 10/1968 | Caldwell et al. | 260/78 |
| 4,367,329 | 1/1983 | Sankaran et al. | 528/183 |
| 4,429,109 | 1/1984 | Curatolo et al. | 528/331 |
| 4,713,438 | 12/1987 | Harris et al. | 528/337 |
| 4,728,548 | 3/1988 | Davis | 428/35 |

Primary Examiner—Harold D. Anderson  
Attorney, Agent, or Firm—Charles E. Bricker; Donald J. Singer

[57] ABSTRACT

There is provided an aromatic polyamide having repeating units of the formula:

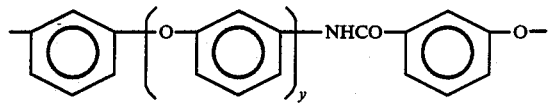

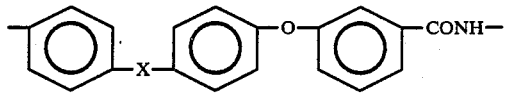

wherein X is -O-, -S-, -CO- or -SO$_2$- and y has a value of 1 or 2.

Also provided is an aromatic polyamide having repeating units of the formula:

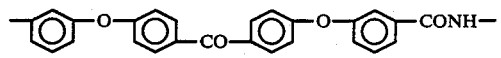

and a new composition of matter 3-[4-(3-aminophenoxy benzoyl)phenoxy] benzoic acid.

11 Claims, No Drawings

LOW GLASS TRANSITION TEMPERATURE AROMATIC POLYAMIDE

RIGHTS OF THE GOVERNMENT

The invention described herein may be manufactured and used by or for the Government of the U.S. for all governmental purposes without the payment of any royalty.

BACKGROUND OF THE INVENTION

This invention relates to aromatic polyamides. In particular, it relates to amorphous aromatic polyamides having low glass transition temperatures.

Considerable effort has been expended on research leading to the preparation of molecular composites. From this research has arisen the need for new thermoplastic polymers to act as matrices for rod-like polymers in the molecular composites.

Rod-like polymers are generally processed from a strongly acidic medium, such as methanesulfonic acid. It is therefore necessary that the thermoplastic matrix be soluble and chemically stable in such strongly acidic medium.

Aliphatic polyamides have been used as the thermoplastic matrix for rod-like polymers, but lack thermooxidative stability. While aromatic polyamides exhibit substantially increased thermooxidative stability, they generally exhibit high glass transition temperatures (Tg's) or substantial crystallinity and are, therefore, extremely difficult to process and consolidate when employed with a rod-like polymer in a molecular composite.

Accordingly, it is an object of the present invention to provide aromatic polyamides having low glass transition temperatures.

Other objects, aspects and advantages of the present invention will be apparent to those skilled in the art from a reading of the following disclosure of the invention.

DESCRIPTION OF THE INVENTION

In accordance with the present invention, there is provided an aromatic polyamide having repeating units of the formula:

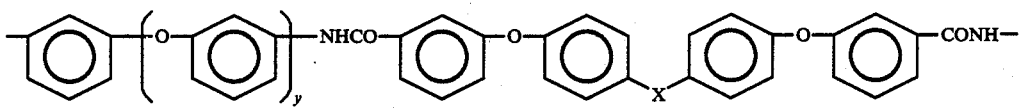

I.

wherein X is —O—, —S—, —CO— or —SO$_2$— and y has a value of 1 or 2.

Also provided is an aromatic polyamide having repeating units of the formula:

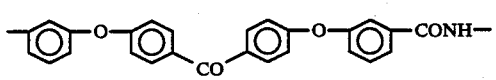

II.

and a new composition of matter 3-[4-(-aminophenoxybenzoyl)-phenoxy]benzoic acid.

Polymer I is prepared by the polycondensation of an aromatic dicarboxylic acid or dicarboxylic acid halide of the formula

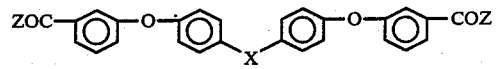

wherein Z is —OH or —Cl, —Br, —I or —F and X is as defined previously, and an aromatic diamine of the formula

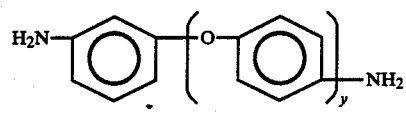

wherein y is 1 or 2.

The aromatic dicarboxylic acids and acid halides are prepared using the method disclosed in U.S. patent application Ser. No. 70/089,652 filed Aug. 24, 1987, now U.S. Pat. No. 4,845,286, which is incorporated herein by reference. The diamines are commercially available.

The polycondensation reaction of the aromatic dicarboxylic acid halide and the aromatic diamine is carried out in the presence of an acid acceptor at low temperature, i.e., about −80° to +10° C. for about 0.1 to 5 hours. Following the initial reaction period, the reaction mixture may be allowed to warm to room temperature. The mixture is preferably stirred at room temperature for about 5 to 72 hours.

The polycondensation reaction of the aromatic dicarboxylic acid and the aromatic diamine is carried out at a temperature of about 20° to 120° C. for about 0.5 to 24 hours in the presence of an alkali metal salt, such as lithium chloride and a suitable catalyst system, such as triphenyl phosphite/pyridine.

Substantially equimolar amounts of the reactants are used. The reaction is carried out in a suitable solvent, i.e., one which is inert to the reactants and the resulting polymer, and one in which at least one of the reactants is soluble. Examples of suitable solvents include N-methylpyrrolidinone, N,N-dimethylacetamide, N,N-diethylacetamide, N,N-dimethylformamide, tetramethylurea, hexamethylphosporamide, sulfolane, dimethylsulfoxide and the like.

At the end of the reaction period, the polymer is recovered by a general procedure that is conventionally followed in solution polymerization processes. For example, the reaction mixture may be poured into a non-solvent for the polymer, e.g., an alcohol such as methanol, thereby causing the polymer to precipitate from solution. The precipitated polymer is separated from the liquid by any suitable means, such as filtration or decantation. The precipitated polymer may then be washed with the so-called non-solvent. If desired, the polymer can be dissolved in a suitable solvent and again precipitated from solution into a non-solvent.

Polymer II is prepared by the polycondensation of 3-[4-(3-aminophenoxybenzoyl)phenoxy]benzoic acid, which is prepared according to the following reactions:

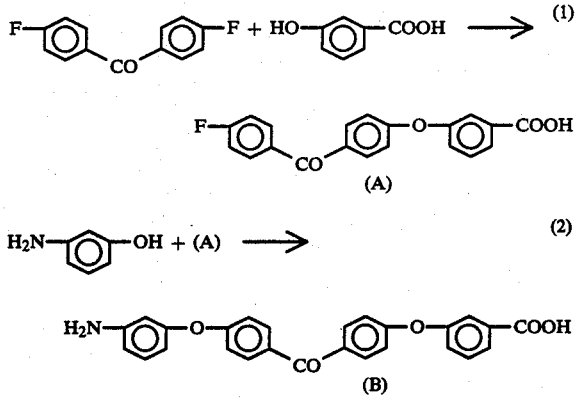

As shown by reaction (1), 4,-4-difluorobenzophenone is reacted with 3-hydroxybenzoic acid to obtain 3-[4-(4-fluorobenzoyl)phenoxy]benzoic acid. The reaction is carried out in a suitable aprotic solvent, such as dimethylsulfoxide or N,N-dimethylformamide, under an inert atmosphere, at an elevated temperature of about 100° to 140° C. for about 8 to 64 hours. The 3-[4-(4-fluorobenzoyl)phenoxy]benzoic acid (A) is then reacted with 3-aminophenol, as shown by reaction (2) to obtain 3-[4-(3-aminophenoxybenzoyl)phenoxy]benzoic acid (B). This reaction is carried out in a suitable aprotic solvent, under an inert atmosphere, at an elevated temperature of about 100° to 140° C. for about 8 to 64 hours. At the end of the reaction period, the reaction mixture is cooled, then poured into water, which is then neutralized to precipitate the monomer (B). If desired, the crude monomer can be purified by recrystallization or by dissolving it in a suitable solvent and precipitating it from solution into a suitable non-solvent.

The polycondensation of the monomer (B) is carried out in a suitable solvent, as previously described, at a temperature of about 20° to 120° C. in the presence of an alkali metal salt and a suitable catalyst, both described previously. At the end of the reaction period, the polymer is recovered as previously described.

The polymers of this invention exhibit high thermooxidative stability with relatively low glass transition temperatures. These polymers are useful as matrix materials in molecular composites.

The following examples illustrate the invention:

EXAMPLE I

Preparation of 3-[4-(3-aminophenoxybenzoyl)phenoxy]benzoic acid

A mixture of 4,4'-difluorobenzophenone (25.2 g, 115.5 mmol), 3-hydroxybenzoic acid (8.0 g, 57.9 mmol), and anhydrous potassium carbonate (16.0 g) in dry dimethylsulfoxide (120 ml, distilled under reduced pressure from calcium hydride) was stirred at 120° C. under nitrogen for 48 hours. At the end of this period the reaction mixture was poured into water, and the suspension thus obtained was filtered through Celite. The clear filtrate was cooled, then carefully acidified with conc. hydrochloric acid until strongly acidic. The white precipitate that formed was filtered and recrystallized from aqueous ethanol. Two recrystallizations gave 9.5 g (48%) of 3-[4-(4-fluorobenzoyl)phenoxy]benzoic acid with m.p. 158.5°-160° C. A sample with m.p. 159°-161.5° C. could not be purified further by recrystallization.

Anal. Calc'd for $C_{20}H_{13}FO_4$: C, 71.42; H, 3.89; F, 5.64.

Found: C, 71.30; H, 3.96; F, 5.44.

A mixture of m-aminophenol (0.64 g, 5.87 mmol), 3-[4-(4-fluorobenzoyl)phenoxy]benzoic acid (2.0 g, 5.95 mmol), and anhydrous potassium carbonate (4.0 g) was stirred in dry dimethylsulfoxide (20 ml) at 120° C. under nitrogen for 48 hours. The cooled reaction mixture was poured into water and carefully neutralized with conc. hydrochloric acid to precipitate 2.58 g of a white solid. The crude product was digested in hot toluene, and the toluene solution (after decanting from a large quantity of gum) was allowed to stand overnight at 0° C. The crystals thus obtained were recrystallized to give 0.35 g of product, m.p. 144°-150° C. dec. (14%).

Anal. Calc'd for $C_{28}H_{19}NO_5$: C, 73.40; H, 4.50; N, 3.29.

Found: C, 73.53; H, 4.69; N, 3.74.

EXAMPLE II

Polycondensation of 3,3'-[Sulfonylbis(4-phenylenoxy)]dibenzoic acid and 3,3'-(m-phenylendioxy)dianiline Dried N-methylpyrrolidinone (2.0 ml) was added to a mixture of 3,3'-[sulfonylbis(4-phenylenoxy)]dibenzoic acid (0.6955 g, 1.48 mmol), 3,3'-(1,3-phenylendioxy)-dianiline (0.4314 g, 1.48 mmol) (available from Frinton Laboratories, Vineland, N.J., and anhydrous lithium chloride (0.1 g). Triphenyl phosphite (0.37 ml) and dry pyridine (0.5 ml) were also added. The reaction mixture was heated under nitrogen with stirring to 100° C. for four hours. As the polycondensation proceeded, the solution became viscous and the lithium chloride suspension dissolved. The polyamide was isolated as a stringy mass by precipitation from methanol. It was purified by reprecipitation from methanol after redissolution in N,N-dimethylacetamide (4.0 ml). The product (1.01 g, 95% yield) was dried overnight at 100° C. (0.1 mm Hg) and exhibited an inherent viscosity of 0.27 dl/g (N,N-dimethylacetamide, 30° C., 0.2 g/dl).

Anal. Calc'd for $C_{44}H_{30}N_2SO_8$: C, 70.76; H, 4.04; N, 3.75; S, 4.29.

Found: C, 70.81; H, 4.19; N, 4.00; S, 4.23.

EXAMPLE III

Polycondensation of 3,3'-[Sulfonylbis(4-phenylenoxy)]dibenzoyl chloride and 3,3'-(m-phenylendioxy)dianiline A mixture of 3,3'-[sulfonylbis(4-phenylenoxy)]dibenzoyl chloride (0.4134 g, 0.785 mmol) and 3,3'-(1,3-phenylendioxy)dianiline (0.2291 g, 0.785 mmol) was cooled to −78° C. under nitrogen. Dry N-methylpyrrolidinone (4.5 ml) and propylene oxide (0.33 ml) were then added. After a few minutes, the cooling bath was removed and the contents of the flask stirred while being allowed to warm to room temperature. After being stirred overnight, the viscous solution was poured into methanol, with stirring, to yield a stringy mass. The polymer was purified by reprecipitation from methanol after redissolution in N,N-dimethylacetamide (4.0 ml). The product (0.4 g, 69%) was dried overnight at 100° C. (0.1 mm Hg). An inherent viscosity of 0.55 dl/g (N,N-dimethylacetamide, 30+ C., 0.2 g/dl) was recorded.

Anal. Calc'd for $C_{44}H_{30}N_2SO_8$: C, 70.76; H, 4.04; N, 3.75; S, 4.29.

Found: C, 70.58; H, 4.00; N, 3.90; S, 4.18.

EXAMPLE IV

Polycondensation of 3,3'-[carbonylbis(4-phenylenoxy)]dibenzoyl chloride and 3,3'-(m-phenylendioxy)dianiline The procedure of Example III was followed using the above-named reactants, (66% yield) inherent viscosity 0.63 dL/g (N,N-dimethylacetamide, 30° C., 0.2 g/dl).

Anal. Calc'd for $C_{45}H_{30}N_2O_7$: C, 76.04; H, 4.25; N, 3.94.

Found C, 75.37; H, 4.30, N, 4.13.

EXAMPLE V

Polycondensation of 3-[4-(3-aminophenoxybenzoyl)-phenoxy]benzoic acid

The monomer obtained in Example I was polymerized according to the procedure given in Example II (85% yield). Inherent viscosity 0.43 dL/g (N,N-dimethylacetamide, 30° C., 0.2 g/dl).

Anal. Calc'd for $C_{26}H_{17}NO_4$: C, 76.64; H, 4.20; N, 4.43.

Found: C, 76.07; H, 4.17; N, 4.30.

EXAMPLE V

Thermal characterization of the polymers prepared in Examples III-V was carried out by means of differenetial scanning calorimetry (DSC), thermogravimetric analysis (TGA), and isothermal aging. Thermal characterization data are given in the following Table. Tg's in the range of 128°-169° C. were recorded. No evidence of crystallinity was observed. After cycling within the instrument to 450° C. (nitrogen atmosphere, 10° C./min), increases in Tg were observed, presumably due to initial degradation and crosslinking of the polymers. Thermogravimetric analysis (air atmosphere, 10° C./min) disclosed early weight losses of 1-5 percent, possibly due to volatiles trapped within the polymers. Thermooxidative degradation commenced in the range of 410°-430° C. with essentially complete weight loss being recorded at 700° C. Under isothermal aging in air at 316° C., early weight losses possibly attributable to absorbed water were also observed. After 200 hours, weight losses of 20-50 percent were recorded.

TABLE
THERMAL CHARACTERIZATION OF AROMATIC POLYAMIDES

| Polymer | Tg (initial)[1] | Tg (Final)[2] | T dec[3] |
|---|---|---|---|
| III | 128 | 154 | 429 |
| IV | 144 | 153 | 413 |
| V | 169 | — | 419 |

[1]Determined in nitrogen
[2]After heating to 450° C. in nitrogen
[3]As indicated by thermogravimetric analysis in air Various modifications may be made to the foregoing without departing from the spirit of the invention or the scope of the appended claims.

We claim:

1. An aromatic polyamide having repeating units of the formula:

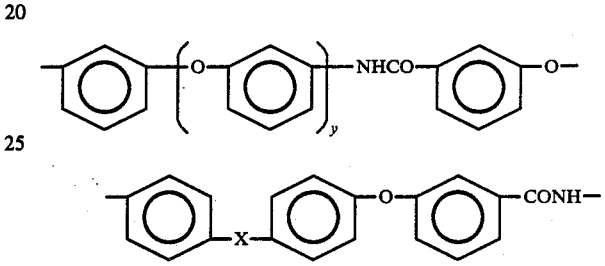

wherein X is —O—, —S—, —CO— or —SO$_2$— and y has a value of 1 or 2.

2. The polymer of claim 1 wherein y is 2.
3. The polymer of claim 2 wherein X is —CO—.
4. The polymer of claim 2 wherein X is —SO$_2$—.
5. The polymer of claim 2 wherein X is —O—.
6. The polymer of claim 2 wherein X is —S—.
7. The polymer of claim 1 wherein y is 1.
8. The polymer of claim 7 wherein X is —CO—.
9. The polymer of claim 7 wherein X is —SO$_2$—.
10. The polymer of claim 7 wherein X is —O—.
11. The polymer of claim 7 wherein X is —S—.

* * * * *